(12) United States Patent
Czudak et al.

(10) Patent No.: US 8,498,012 B2
(45) Date of Patent: Jul. 30, 2013

(54) PRINT JOB MANAGEMENT SYSTEMS AND METHODS

(75) Inventors: John C. Czudak, Conesus, NY (US); Patrick J. Waara, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 2794 days.

(21) Appl. No.: 11/113,528

(22) Filed: Apr. 25, 2005

(65) Prior Publication Data
US 2006/0238800 A1  Oct. 26, 2006

(51) Int. Cl.
*G06F 15/00* (2006.01)

(52) U.S. Cl.
USPC ......... 358/1.18; 358/1.9; 358/1.13; 358/1.15; 715/234

(58) Field of Classification Search
USPC .............. 358/1.18, 1.9, 1.13, 1.15; 715/234
See application file for complete search history.

(56) References Cited

U.S. PATENT DOCUMENTS

| | | | |
|---|---|---|---|
| 5,287,194 A * | 2/1994 | Lobiondo | 358/296 |
| 5,652,711 A | 7/1997 | Vennekens | |
| 6,606,165 B1 * | 8/2003 | Barry et al. | 358/1.9 |
| 2002/0015169 A1 | 2/2002 | Vidyanand | |
| 2002/0069228 A1 | 6/2002 | Mori et al. | |
| 2003/0184799 A1 | 10/2003 | Ferlitsch | |
| 2004/0061890 A1 | 4/2004 | Ferlitsch | |
| 2004/0070788 A1 | 4/2004 | Barry et al. | |
| 2004/0126165 A1 | 7/2004 | Carroll | |
| 2004/0196498 A1 | 10/2004 | Klassen | |
| 2004/0239981 A1 | 12/2004 | Ducato et al. | |
| 2004/0243934 A1 | 12/2004 | Wood et al. | |

* cited by examiner

*Primary Examiner* — David K Moore
*Assistant Examiner* — Mark Milia
(74) *Attorney, Agent, or Firm* — Gibb & Riley, LLC

(57) ABSTRACT

A print job management method and system receive variable information print instructions in a container file. The container file includes print files and resource files. The method/system decomposes the container file into multiple sub-container files and processes the sub-container files through at least two print engines. In additional embodiments, the method/system can reprocess less than all of the print files if there is a need to reprint any portion of the original print job. In one embodiment, the sub-container files each comprise a subset of the print files and all of the resource files. In a different embodiment, the resource files are stored on a shared resource and the sub-container files only comprise a subset of the print files.

16 Claims, 2 Drawing Sheets

PRINT JOB MANAGEMENT SYSTEMS AND METHODS

BACKGROUND

Embodiments herein generally relate to print job management systems and methods that involve variable information (VI) or variable data print files. Documents created in electronic form are often represented in a page description language ("PDL"), such as PostScript, PCL, AgfaScript and IPDS. In a PDL representation, a document may be described in terms of commands that represent text and graphical objects. To view or print the document, the PDL commands are sent to a raster image processor ("RIP"), which interprets the PDL commands and generates electronic signals used by an output device to render the text and graphical objects. For example, the RIP may be part of a personal computer or workstation, and the output device may be a video display screen. Alternatively, the RIP may be part of a printer controller, and the output device may be a print engine. In either case, the RIP converts the PDL print stream to a raster bitmap.

A raster bitmap represents the pixels displayed or written by an output device such as a xerographic device and the values used to vary the pixel density. For example, if the density of an output device pixel can have either of two values (e.g., black or white), the bitmap requires one bit for each pixel. For color output devices, a unique bitmap is used for each colorant. Thus, for a print output device that uses cyan, magenta, yellow and black colorants, four bitmaps are used. To print each page of such a document on a high speed color printer, the RIP must generate and provide to the print engine more than three billion bits per second. As a result, RIP processing time often is a bottleneck in achieving high-speed printing. To increase print speed, therefore, it is necessary to split print jobs among multiple print engines.

Previously known techniques for reducing RIP processing time have included parsing a PDL data stream into multiple segments, and then processing the various segments in parallel to different print engines. For example, U.S. Pat. No. 5,652,711, incorporated herein by reference, describes methods for parallel processing a PDL data stream. In particular, U.S. Pat. No. 5,652,711 describes providing a PDL data stream that includes data commands and control commands to a master process, which divides the PDL data stream into independent data stream segments that are converted to intermediate data stream portions by multiple sub-processes. Data commands describe the data that must be reproduced by the output device, such as text, graphics and images, whereas control commands describe how the data must be reproduced, and may include font descriptions, page sections, forms and overlays. Each independent data stream segment includes data commands to describe the images included in a single page or region (i.e., a disjunctive portion of a physical medium), and also includes control commands to instruct how the data commands must be interpreted.

U.S. Patent Publication 2004/0243934, incorporated herein by reference, illustrates a segmentation process for use with a PDL data stream and describes a variable data document that includes variable data portions and fixed-data portions. This segmenting process divides the PDL data stream into variable-data and non-variable data segments. Thus, for example, one non-variable region may correspond to a first non-variable region in the PDL data stream, one variable region may correspond to a first variable region in the PDL data stream, a second non-variable region may correspond to a second non-variable region in the PDL data stream, a second variable region may correspond to a second variable region in the PDL data stream, and so on. In 2004/0243934, two data files are created for each segment. In particular, for each segment, an associated global data file and an associated segment data file are created. Each global data file includes all PDL operations from the associated segment that might affect subsequent segments. For example, global data files may include font settings, fill pattern settings, forms from variable data files, context settings or other similar settings that may be carried over to subsequent segments. Each segment data file, in contrast, includes all PDL commands necessary to interpret the associated segment (including everything in the global data file associated with that segment).

In 2004/0243934, the data file creation process receives PDL data segments, and then creates a global data file and a segment data file for each associated segment, and stores the data files in memory buffers. However, variable information print jobs are most often very large and composed of a print stream and many associated resource files. Typically, the window of time to print these jobs is small, such as in bill printing. Sending the entire print job to a single printer can exceed the time allowed to print the job. Often going back to the originating application and creating many smaller print jobs to be distributed is not possible. Embodiments herein describe a method to automatically take a large variable information job and split it across multiple printers for efficient printing.

SUMMARY

In general, the embodiments described herein automatically split a variable information print job across multiple printers to decrease the time needed to print the entire job. Variable information print jobs are typically made of a print stream and associated resource files, such as TIFF files, PostScript segments, etc. There are multiple types of variable information print streams, such as personalized print markup language (PPML) or variable intelligent personalized PostScript (VIPP). To easily facilitate moving the print files and their associated resource files, the print files and resource files are often packaged in zip files or VIPP container files. For purposes of this application, the term container is intended to include all such file types, whether currently known or developed in the future. Therefore, for example, the term container, as used herein, can include TIFF, PDF, PPML, VIPP, etc., type files. Further, if such files are not actually packaged as a container files, the embodiments herein can package such files into containers. With embodiments herein, the container files are examined, decomposed, reassembled into smaller print files with duplicated resource files, and submitted to multiple printers to reduce the printing time required to print the entire job.

A print job management method embodiment receives variable information print instructions in a container file. The container file includes print files and resource files. The method decomposes the container file into multiple sub-container files and processes the sub-container files through at least two print engines. In additional embodiments, the method can reprocess less than all of the print files if there is a need to reprint any portion of the original print job. In one embodiment, the sub-container files each comprise a subset of the print files and all of the resource files. In a different embodiment, the resource files are stored on a shared resource, such as a file server, and the sub-container files only comprise a subset of the print files.

The process of decomposing the container file comprises creating the sub-container files, copying the resource files to the sub-container files (or the shared resource), and dividing the print files between the sub-container files. When dividing the print files the method maximizes utilization of the print engines.

One aspect of variable information print instructions is that they can only be divided at a print file level, as opposed to page level. When processing the sub-container files through the print engines, the method combines aspects of the resource files with the print files and prints the print files using the print engines. The container file is prepared by an originating variable information capable application.

A print job management system embodiment comprises a repository that receives the variable information print instructions in the container file from the originating variable information capable application, an output manager that is operatively connected to the repository, and a print submission unit operatively connected to the output manager. The output manager decomposes the container file into the multiple sub-container files. The print submission unit processes the sub-container files through the print engines. Again, the output manager provides the resource files to the shared resource when decomposing the container file.

The output manager creates the sub-container files, copies the resource files to the sub-container files or to the shared resource, and divides the print files between the sub-container files. When dividing the print files, the output manager maximizes utilization of the print engines. The print engines combine aspects of the resource files with the print files when printing the sub-container files.

Also, if reprinting is required, the user can reprocess less than all of the print files logical records and/or resources through the print submission unit. Thus, even if the records were split into different sub-containers, it is easy for the operator to reprint the records from the original container. Note, the sub-containers are not necessarily retained in the output manager, though they could be. Thus, the method/system can reprocess less than all of the print files if there is a need to reprint any portion of the original print job. More specifically, if reprinting is required, the output manager can reprocess less than all of the print files through the print submission unit. The output manager gives the operator the ability to manually manage each different sub-container such that each individual sub-container can be individually redirected to the print engines. This avoids having to return to the application to originate a completely new container with a partial print job. Instead, with this embodiment, the operator of the output manager simply reselects one or more of the print files or records, creates one or more new subcontainers, and sends the new subcontainers to the print server/printers. Another aspect of manually managing the VI containers is to manually manage the resources. For example, a new container may be submitted to the output manager that contains a new version of the a TIFF file. Just this TIFF file may be stored on the shared resource (e.g., shared file server.)

Another embodiment automatically stores the resource files in a shared repository and makes a shared repository accessible to all the print servers and printers so that the variable information job can be split across multiple printers. When the variable information job is being processed by the print server/printer, the print server/printer can determine what resources are needed to be access from the shared resource. This embodiment reduces transmission time, storage space usage, and maintains consistency across all printers because all printers/print engines are drawing the resource files from the same location (shared resource). Maintaining consistency across printers is important especially as resource files change and, by utilizing a single shared resource, the consistency among the printers is substantially increased.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mention above, variable information (VI) print jobs are most often very large and composed of a print stream and many associated resource files. Typically, the window of time to print these jobs is small, such as in bill printing. Sending the entire print job to a single printer can exceed the time allowed to print the job. Often going back to the originating application and creating many smaller print jobs to be distributed is not possible. Embodiments herein described a method to automatically take a large variable information job and split it across multiple printers for efficient printing.

Variable information print jobs are typically made of a print stream and associated resource files, such as TIFF files, PostScript segments, etc. There are multiple types of variable information print streams, such as Personalized Print Markup Language (PPML) or Variable Intelligent Personalized Postscript (VIPP). To easily facilitate moving the print files and their associated resource files, the print files and resource files are often packaged in zip files or VIPP container files. With embodiments herein, the container files are examined, decomposed, reassembled into smaller print files with duplicate resource files and submitted to multiple printers to reduce the printing time required to print the entire job.

Figure 1:
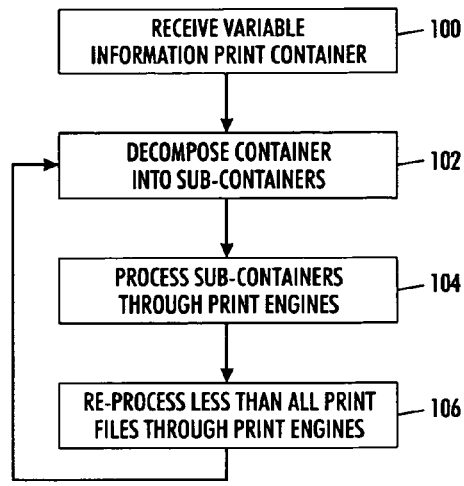
FIG. 1 is a flowchart illustrating a method embodiment.

As shown in the flowchart in FIG. 1, in item 100, a print job management method embodiment receives variable information print instructions in a container file from an originating variable information capable application. The container file received from the originating variable information capable application comprises a file e.g. (a zip file) that includes print files and resource files. The print files can comprise, for example, Personalized Print Markup Language (PPML) files, Variable-data Intelligent PostScript Printware (VIPP) files, etc. The resource files can comprise, for example, TIFF files, PostScript segments, EPS files, etc. The method decomposes the container file into multiple sub-container files in item 102 and processes the sub-container files through at least two print engines in item 104.

As each individual sub-container is printed by the printing engines, problems can arise which require only a portion of the job the reprinted. For example, a portion of the total print job can be destroyed during subsequent processing, such as during transportation, storage, during envelope stuffing, etc. In order to reprint only a portion of the print job, conventional systems require returning to the original authoring application and generating a new print container that includes only a portion of the original job. However, this is inefficient and consumes more resources than is necessary. Therefore, in additional embodiments, the method can reprocess less than all of the logical records and resources of the print files if there is a need to reprint any portion of the original print job in item 106. More specifically, as discussed in greater detail below, this embodiment gives the output management operator the ability to manually manage each different print file such that each individual logical record and resource can be individually redirected to the print engines.

Figure 2:
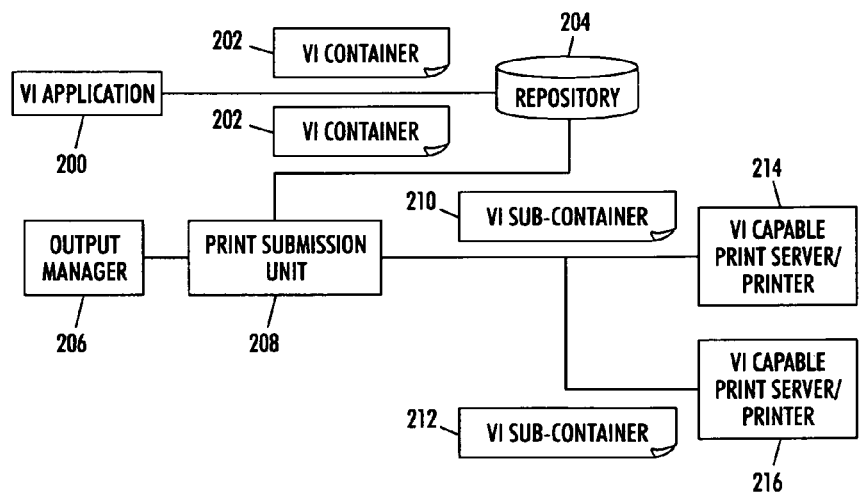
FIG. 2 is a schematic representation of a print job management system embodiment.

FIG. 2 illustrates a print job management system embodiment. A repository 204 receives the variable information print instructions in the container file 202 from the originating variable information capable application 200. An output manager 206 is operatively connected to the repository 204, a print submission unit 208 is operatively connected to the output manager 206, and VI capable print servers/printers 214, 216 are operatively connected to the print submission unit 208.

The output manager 206 receives the container file 202 from the repository and decomposes the container file 202 into the multiple sub-container files 210, 212. In this embodiment, the sub-container files 210, 212 each comprise a subset of the print files and all of the resource files. The print submission unit 208 processes the sub-container files 210, 212 through the print engines 214, 216.

When the output manager 206 creates the sub-container files 210, 212, the output manager 206 copies all the resource files to each of the sub-container files 210, 212, and divides the print files between the sub-container files 210, 212. When dividing the print files, the output manager 206 maximizes utilization of the print engines. The print engines 214, 216 combine aspects of the resource files with the print files when printing the sub-container files 210, 212.

When maximizing the utilization of the print engines, the process may, for example, distribute sub-containers between printers/print engines by sequentially assigning sub-containers to the next available printer/print engine processor. In this regard, the workload of printers/print engines may be automatically load-balanced between the various printers. In one example, the scheduling process may implement other techniques for distributing sub-container files. For example, the scheduling process may assign sub-containers associated with text segments to printers/print engines that are customized for interpreting text data, and may assign sub-containers associated with image segments to printers/print engines that are customized for interpreting image data.

The output manager 206 is allowed to be manually managed by the user so that print files and resources can be handled as the user desires. This allows specific portions of the overall print job to be directed to specific print engines, etc. Further, with this feature, as discussed above, the method/system can reprocess less than all of the print files if there is a need to reprint any portion of the original print job in item 106. More specifically, if reprinting is required, the output manager 206 can reprocess less than all of the container file through the print submission unit 208.

To reprint only some of the logical records (print files) and thereby reprint less than all of the original container file, the embodiments herein allow the user (through the output manager 206) to select specific print files that are to the reprinted. Once the group of print files that are to be reprinted is specified by the user, the output manager 206 creates one or more additional sub-container files for reprinting. These additional sub-container files again contain all of the resources, yet only contained the logical records (print files) that are to the reprinted. These additional sub-container files could be one or more of the previously used sub-container files, or could be completely new sub-container files. Alternatively, if the shared resource 300 (discussed below) is utilized, the additional sub-container files need only contain the logical records that are to the reprinted.

Thus, the output manager 206 gives the operator the ability to manually manage each different sub-container such that each individual print file can be individually redirected to the print engines. This avoids having to return to the application 200 to originate a completely new container with a partial print job. Instead, with this embodiment, the operator of the output manager 206 resends one or more of the logical records and/or resources to the printers 214, 216 using additional sub-container files.

The previous embodiments duplicate the resource files within each subcontainer 210, 212. This process may consume an undesirably large amount of storage space and can also increase transmission time. Therefore, another embodiment automatically stores the resource files in a shared repository server and makes a shared repository server accessible to all the print servers and printers so that the variable information job can be split across multiple printers. When the variable information job is being processed by the print server/printer, the print server/printer can determine what resources are needed to be access from the shared resource. This embodiment reduces transmission time, storage space usage, and maintains consistency across all printers because all printers/print engines are drawing the resource files from the same location (shared resource). Maintaining consistency across printers is important especially as resource files change and, by utilizing a single shared resource, the consistency among the printers is substantially increased.

Figure 3:
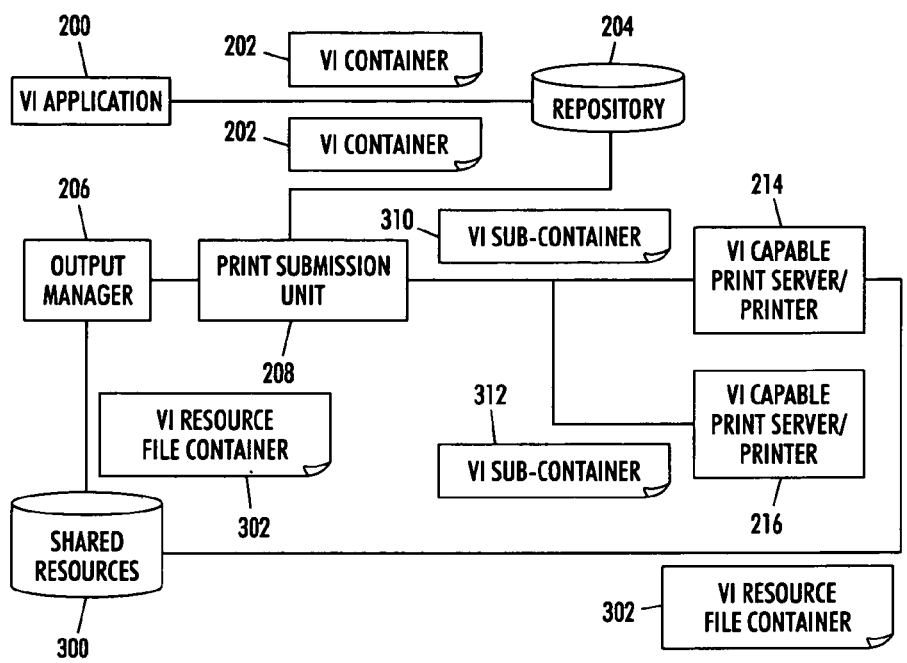
FIG. 3 is a schematic representation of a print job management system embodiment.

In this embodiment, shown in FIG. 3, the shared resource 300 stores the resource files 302. Thus, in this embodiment, the output manager 206 provides the resource files 302 to the shared resource server 300 when decomposing the container file 202. In this embodiment, since the resource files 302 are stored on the shared resource 300, the sub-container files 310, 312 only comprise a subset of the print files and do not contain resources.

Thus, as shown above, variable information print jobs are most often very large and composed of a print stream and many associated resource files. Typically, the window of time to print these-jobs is small, such as in bill printing. Sending the entire print job to a single printer can exceed the time allowed to print the job. Often going back to the originating application and creating many smaller print jobs be distributed is not possible. Embodiments herein describe a method to automatically take a large variable information job and split it across multiple printers for efficient printing. Embodiments described herein automatically split a variable information print job across multiple printers to decrease the time needed to print the entire job. With embodiments herein, the container files are examined, decomposed, reassembled into smaller print files with duplicated resource files (or shared print server), and submitted to multiple printers to reduce the printing time required to print the entire job.

If reprinting is required, the output manager can reprocess less than all of the print files through the print submission unit. The output manager operator has the ability to manually manage each different print file and resource such that each individual print file and resource can be individually redirected to the print engines. This avoids having to return to the application to originate a completely new container with a partial print job. Instead, with this embodiment, the operator of the output manager simply selects one or more of the print files and/or resources and sends new subcontainers to the print server/printers.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A machine implemented print job management method comprising:
   receiving variable information print instructions in a container file, wherein said container file comprises print files and resource files;
   decomposing said container file into multiple sub-container files, wherein said sub-container files each comprise a subset of said print files and all of said resource files; and
   processing said sub-container files through at least two print engines to produce printed output.

2. The method according to claim 1, wherein said decomposing comprises:
   creating said sub-container files;
   copying said resource files to said sub-container files; and
   dividing said print files between said sub-container files.

3. The method according to claim 2, wherein said dividing of said print files comprises maximizing utilization of said print engines.

4. The method according to claim 1, wherein said processing of said sub-container files through said print engines comprises using aspects of said resource files with said print files, and printing said print files using said print engines.

5. The method according to claim 1, further comprising preparing said container file using an originating variable information capable application.

6. A machine implemented print job management method comprising:
   receiving variable information print instructions in a container file, wherein said container file comprises print files and resource files;
   decomposing said container file into multiple sub-container files, wherein said sub-container files each comprise a subset of said print files and all of said resource files;
   processing said sub-container files through at least two print engines to produce printed output; and
   reprocessing less than all of said print files in at least one additional sub-container file.

7. The method according to claim 6, wherein said decomposing comprises:
   creating said sub-container files;
   copying said resource files to said sub-container files; and
   dividing said print files between said sub-container files.

8. The method according to claim 7, wherein said dividing of said print files comprises maximizing utilization of said print engines.

9. The method according to claim 6, wherein said processing of said sub-container files through said print engines comprises using aspects of said resource files with said print files, and printing a combination of said resource files and said print files using said print engines.

10. The method according to claim 6, further comprising preparing said container file using an originating variable information capable application.

11. A machine implemented print job management system comprising:
    a repository adapted to receive variable information print instructions in a container file, wherein said container file comprises print files and resource files;
    an output manager operatively connected to said repository, wherein said output manager is adapted to decompose said container file into multiple sub-container files, wherein said sub-container files each comprise a subset of said print files and all of said resource files; and
    a print submission unit operatively connected to said output manager, wherein said print submission unit is adapted to process said sub-container files through at least two print engines to produce printed output.

12. The system according to claim 11, wherein said output manager is further adapted to reprocess less than all of said print files in at least one additional sub-container file through said print submission unit.

13. The system according to claim 11, wherein said output manager is further adapted to:
    create said sub-container files;
    copy said resource files to said sub-container files; and
    divide said print files between said sub-container files.

14. The system according to claim 13, wherein said output manager is adapted to maximize utilization of said print engines when dividing said print files.

15. The system according to claim 11, wherein said print engines combine aspects of said resource files with said print files when printing said sub-container files.

16. The system according to claim 11, wherein said repository is adapted to receive said variable information print instructions from an originating variable information capable application.

* * * * *